United States Patent Office 3,371,101
Patented Feb. 27, 1968

3,371,101
PROCESS FOR THE PREPARATION OF HALO-SUBSTITUTED POLYHYDRODIALKANOTRI-CYCLIC DICARBOXYLIC ACIDS AND CARBOXY DERIVATIVES THEREOF
Herman S. Bloch, Skokie, Ill., assignor to Universal Oil Products Company, Des Plaines, Ill., a corporation of Delaware
No Drawing. Filed May 8, 1964, Ser. No. 366,165
10 Claims. (Cl. 260—346.6)

ABSTRACT OF THE DISCLOSURE

Preparation of halo-substituted polyhydrodialkanotricyclic dicarboxylic acid by condensing maleic acid with vinylacetylene at a temperature of 35°–125° C., thereafter further condensing the resultant product with a chloro- or bromo-substituted cycloalkadiene at a temperature of 50°–200° C.

This invention relates to a process for the preparation of halo-substituted polyhydrodialkanotricyclic dicarboxylic acids and carboxy derivatives thereof. More specifically, the invention is concerned with a novel process for preparing halo - substituted polyhydrodimethanophenanthrene dicarboxylic acids and carboxy derivatives thereof.

It has now been discovered that halo-substituted polyhydrodialkanotricyclic dicarboxylic acids and carboxy derivatives thereof may be prepared according to the novel process hereinafter set forth in greater detail, said acids or carboxy derivatives possessing many particular and desirable physical properties which make the compounds commercially attractive to industry. For example, the halo-substituted polyhydrodialkanotricyclic dicarboxylic acids or carboxy derivatives thereof resulting from the process of this invention will possess flame-retardant properties and may therefore be utilized as a starting material, or as one of the components, in the preparation of flame-retardant resins and plastics. These finished resins or plastics, by possessing the aforementioned flame-retardant properties, may be utilized in places where the flame-retardant property is of special advantage. An example of this is utilizing plastics or resins in places which are normally subject to excessive heat or possible flames such as architectural paneling for construction work, wall plugs for electrical connections, switch gear equipment, printed circuits, etc. Other uses for these plastics or resins include theater, school and stadium seats, curtains and drapes, automobile and truck bodies, boat manufacturing, etc. In addition the aforementioned acid or carboxy derivative may also be used as a component in the preparation of polyurethane foams which are characterized by lightness and possess a high degree of flame resistance thereby making the foams valuable for insulation applications where such insulation must also be fire proof, such insulations being used in buildings, refrigerators and refrigerated truck bodies or freight cars, etc., or as an architectural coating for sound deadening purposes.

In addition to the aforementioned uses in the preparation of flame-retardant resins and plastics, the halo-substituted polyhydrodialkanotricyclic dicarboxylic acid or carboxy derivative thereof will also possess insecticidal properties, especially against houseflies.

It is therefore an object of this invention to provide a novel process for preparing halo-substituted polyhydrodialkanotricyclic dicarboxylic acids and carboxy derivatives thereof, said compounds having a wide variety of uses in the chemical field.

In a broad aspect one embodiment of this invention resides in a process for the preparation of a compound selected from the group consisting of halo-substituted polyhydrodialkanotricyclic dicarboxylic acids and carboxy derivatives thereof which comprises condensing a compound selected from the group consisting of maleic acid and carboxy derivatives thereof with vinylacetylene at condensation conditions, thereafter further condensing the resultant product with a halo-substituted cycloalkadiene in which the halogen is selected from the group consisting of chlorine and bromine at condensation conditions, and recovering the resultant compound.

Another embodiment of this invention is found in a process for the preparation of a compound selected from the group consisting of chloro-substituted polyhydrodialkanotricyclic dicarboxylic acids and carboxy derivatives thereof which comprises condensing a compound selected from the group consisting of maleic acid and carboxy derivatives thereof with vinylacetylene at a temperature in the range of from about 35° to about 125° C., thereafter further condensing the resultant product with a chloro-substituted cycloalkadiene at a temperature in the range of from about 50° to about 200° C., and recovering the resultant compound.

Yet another embodiment of this invention is found in a process for the preparation of a halo-substituted polyhydrodialkanotricyclic dicarboxylic acid which comprises condensing maleic acid with vinylacetylene at a temperature in the range of from about 35° to about 125° C., thereafter further condensing the resultant product with a halo-substituted cycloalkadiene in which the halogen is selected from the group consisting of chlorine and bromine at a temperature in the range of from about 50° to about 200° C., and recovering the resultant halo-substituted polyhydrodialkanotricyclic dicarboxylic acid.

A specific embodiment of this invention resides in a process for the preparation of a chloro-substituted polyhydrodialkanotricyclic dicarboxylic anhydride which comprises condensing maleic anhydride with vinylacetylene at a temperature in the range of from about 35° to about 125° C., thereafter further condensing the resultant product with hexachlorocyclopentadiene at a temperature in the range of from about 50° to about 200° C., and recovering the resultant 1,2,3,4,5,6,7,8,11,11,12,12-dodecachloro-1,4,4a,4b,5,8,8a,9,10,10a - decahydro - 1,4,5,8-dimethano-9,10-phenanthrene dicarboxylic anhydride.

Other objects and embodiments will be found in the following further detailed description of this invention.

As hereinbefore set forth, it has now been discovered that halo-substituted polyhydrodialkanotricyclic dicarboxylic acids or carboxy derivatives thereof may be prepared in a novel method encompassing a step-wise process, the first step being that in which maleic anhydride or maleic acid is condensed with vinylacetylene in a Diels-Alder reaction. The term "carboxy derivatives" as used in the present specification and appended claims will refer to anhydrides, esters, salts, amides and nitriles of the halo-substituted polyhydrodialkanotricyclic dicarboxylic acids. The condensation will be effected at temperatures ranging from about 35° to about 125° C. and at pressures ranging from atmospheric up to about 50 atmospheres or more, the amount of pressure being that which is necessary to maintain a substantial portion of the reactants in liquid phase. The resultant compound which contains an allene configuration and comprises 1,2-dicarboxycyclohexadiene - 3,4 - anhydride of the corresponding acid rearranges to form the 3,5 conjugated cyclohexadiene which may also be designated as 1,2-dihydrophthalic acid or 1,2-dihydrophthalic anhydride.

The reaction product of the type hereinbefore set forth resulting from the condensation of maleic anhydride or maleic acid with vinylacetylene is then further condensed in the second step with a halo-substituted cycloalkadiene in a Diels-Alder type reaction at an elevated temperature in the range of from about 50° to about 200° C., the preferred range being from about 100° to about 200° C. In addition, the reaction may also be effected at pressures ranging from atmospheric up to about 100 atmospheres or more, the pressure being sufficient so as to maintain a major portion of the reactants in the liquid phase at the reaction temperature. The reactants are usually present in such a ratio that the mole excess of halo-substituted cycloalkadiene is from about 2 to about 4 moles of halo-substituted cycloalkadiene per mole of the dicarboxycyclohexadiene anhydride or acid.

In the event that a carboxy derivative of the acid is desired, said carboxy derivative may be prepared in any suitable manner. These carboxy derivatives, besides the anhydride of the acid, include esters, particularly the simple esters, such as the alkyl, cycloalkyl, aryl aralkyl and alkaryl esters which may be generically termed "hydrocarbyl esters"; salts, particularly the salts of the alkali metals and alkaline earth metals, said metals being preferred because of relatively lower cost and greater availability; amides and nitriles. Specific examples of the aforementioned esters include the mono- and dimethyl, mono- and diethyl, mono- and dicyclohexyl, mono- and diphenyl, mono- and dibenzyl, mono- and ditolyl esters of the halo-substituted dicarboxycyclohexadiene acid; the sodium, potassium, calcium and magnesium salts of the aforementioned acid; the amides including the mono- and poly-substituted amides, said substituents including di, tri-, and tetra-substituted amides and nitriles. An example of the type of preparation of these carboxy derivatives would be preparing an ester by reacting the halo-substituted dicarboxycyclohexadiene anhydride or acid with a hydroxy-substituted alkyl, cycloalkyl, aryl, alkaryl, and aralkyl compound to prepare the monoester of the acid. Alternatively, if a diester is desired, the reaction is effected in the presence of an acidic catalyst.

Alternatively, if a carboxy derivative of the vinyl acid is desired, the compound may be prepared by first preparing the carboxy derivative of maleic acid and thereafter reacting said carboxy derivative with vinylacetylene in a manner similar to that hereinbefore set forth. Following this the reaction product is then further condensed with a halo-substituted cycloalkadiene to prepare the desired carboxy derivative of the halo-substituted dicarboxycyclohexadiene acid.

Examples of halo-substituted cycloalkadienes which may be used in the process of this invention, in which the halogen is selected from the group consisting of chlorine and bromine atoms, include chloro-substituted 1,3-cyclopentadienes (hereinafter referred to as cyclopentadienes) such as 1 - chlorocyclopentadiene, 2 - chlorocyclopentadiene, 1,2-dichlorocyclopentadiene, 1,5-dichlorocyclopentadiene, 1,2,3-trichlorocyclopentadiene, 1,2,3,4-tetrachlorocyclopentadiene, 1,2,3,4,5 - pentachlorocyclopentadiene, hexachlorocyclopentadiene, bromo - substituted cyclopentadienes such as 1-bromocyclopentadiene, 1,2-dibromocyclopentadiene, 1,2,3 - tribromocyclopentadiene, 1,2,3,4-tetabromocyclopentadiene, 1,2,3,4,5-pentabromocyclopentadiene, hexabromocyclopentadiene, chloro-substituted 1,3-cyclohexadienes (hereinafter referred to as cyclohexadienes) such as 1-chlorocyclohexadiene, 1,2-dichlorocyclohexadiene, 1,3-dichlorocyclohexadiene, 1,5-dichlorocyclohexadiene, 1,6-dichlorocyclohexadiene, 1,2,3-trichlorocyclohexadiene, 1,2,4 - trichlorocyclohexadiene, 1,2,3,4 - tetrachlorocyclohexadiene, pentachlorocyclohexadiene, hexachlorocyclohexadiene, octachlorocyclohexadiene, bromo-substituted cyclohexadienes such as 1-bromocyclohexadiene, 1,2-dibromocyclohexadiene, 1,3-dibromocyclohexadiene, 1,5-dibromocyclohexadiene, 1,6-dibromocyclohexadiene, 1,2,3 - tribromocyclohexadiene, 1,2,4 - tribromocyclohexadiene, 1,2,3,4-tetrabromocyclohexadiene, pentabromocyclohexadiene, hexabromocyclohexadiene, octabromocyclohexadiene, etc. In addition it is also contemplated within the scope of this invention that the cyclopentadienes and cyclohexadienes containing more than one species of halogen substituents may also be used, although not necessarily with equivalent results, such compounds including 1-chloro-2-bromocyclopentadiene, 1,2-dichloro-5,5-dibromocyclopentadiene, 2,3-dichloro-5,5 - dibromocyclopentadiene, 1-chloro-2-bromocyclohexadiene, 1,2-dichloro-3-bromocyclohexadiene, 1,2-dichloro-3,4-dibromocyclohexadiene, etc.

The process of the present invention may be effected in any suitable manner and may comprise either a batch or continuous type operation. For example, in one embodiment illustrating the preparation of a desired halo-substituted polyhydrodialkanotricyclic dicarboxylic acid or anhydride, when a batch type operation is used, a quantity of the starting materials comprising maleic acid or maleic anhydride and vinylacetylene are placed in an appropriate condensation flask. If so desired, an inert solvent such as toluene, benzene, the xylenes, n-pentane, n-hexane, n-heptane, methylcyclopentane, cyclohexane, etc. is also added. The apparatus is then heated to the desired reaction temperature and maintained thereat for a predetermined period of time. At the end of this time the apparatus and contents thereof are allowed to cool to room temperature and the condensation product is recovered and separated from any unreacted starting materials and solvent. Following this a quantity of the starting materials comprising the halo-substituted conjugated cycloalkadiene and the reaction product resulting from the condensation of maleic acid or maleic anhydride and vinylacetylene, usually in an approximately 2:1 or greater mole ratio of cycloalkadiene to reaction product, is placed in a reaction vessel such as an alkylating flask, a rotating autoclave, etc. The reaction may, if so desired, be effected in the presence of an inert organic solvent such as benzene, toluene, the xylenes, methylcyclohexane, n-pentane, n-hexane, n-heptane, etc. If superatmospheric pressures are to be used, the reaction vessel is sealed and an inert gas such as nitrogen is pressed in until the desired pressure is reached. Following this the reaction vessel is heated to the desired temperature and maintained thereat for a predetermined residence time which may be from about 30 minutes up to about 10 hours or more. Upon completion of the reaction the reactor and contents thereof are allowed to cool to room temperature and the desired reaction or condensation product comprising the halo-substituted polyhydrodialkanotricyclic dicarboxylic acid or anhydride is separated from any unreacted starting materials and/or side reactions by conventional means, for example, fractional distillation, crystallization, etc.

It is also contemplated within the scope of this invention that the present process may also be effected in a continuous manner of operation. When this type of operation is used, the starting materials comprising maleic acid or maleic anhydride, or, if so desired, a carboxy derivative thereof, and vinylacetylene are continuously charged to a reaction zone which is maintained at the proper operating conditions of temperature and pressure. In the event that an organic solvent or diluent of the type hereinbefore set forth is used, this solvent or diluent may be continuously charged to the reaction zone through a separate line or, if so desired, may be admixed with one or both of the starting materials and thereafter charged to the reaction zone in a single stream. Upon completion of the reaction time the reactor effluent is continuously withdrawn and the desired condensation product separated therefrom. Following this the starting materials comprising the halo-substituted conjugated cycloalkadiene and the reaction product resulting from the condensation of maleic acid or maleic anhydride and vinylacetylene, usually in an approximately 2:1 mole ratio of cycloalkadiene to reaction product, are continuously charged to a second reaction zone which is also maintained at the proper operating conditions of temperature and pressure. If an organic solvent or diluent of the type hereinbefore set forth is to be used, the solvent may be admixed with one or both of the startin a manner similar to that set forth in Example I above using 1200 cc. of toluene as a diluent. The condensation product is recovered in a conventional manner and 75 grams (0.5 mole) of this product along with 300 grams (1.1 mole) of hexachlorocyclopentadiene along with 200 cc. of toluene are placed in a glass liner of a rotating autoclave. The glass liner is sealed into the autoclave which is thereafter heated to a temperature of 175° C. The autoclave is maintained at this temperature for a period of about 6 hours following which it and the contents thereof are allowed to cool to room temperature. The excess pressure, if any, is vented. The autoclave is opened and the desired reaction product comprising 1,2,3,4,5,6,7,8,11,11,12,12 - dodecachloro - 1,4,4a,4b,5,8,8a,9,10,10a - decahydro - 1,4,5,8 - dimethano - 9,10-phenanthrene dicarboxylic acid is separated and recovered by conventional means.

EXAMPLE III

A mixture of 52 grams (1.0 mole) of vinylacetylene, 98 grams (1.0 mole) of maleic anhydride and 1500 cc. of xylene is subjected to a Diels-Alder condensation at a temperature of about 80° C. in a condensation apparatus for a period of about 4 hours. At the end of this time the condensation product is recovered and 37.5 grams (0.25 mole) of this product along with 276 grams (0.51 mole) of hexabromocyclopentadiene and 200 cc. of xylene is placed in a glass liner of the rotating autoclave. The liner is sealed into the autoclave which is thereafter heated to a temperature of about 165° C. and maintained thereat for a period of about 6 hours. At the end of this time the autoclave and contents thereof are allowed to cool to room temperature. The autoclave is opened and the reaction product comprising 1,2,3,4,5,6,7,8,11,11,12,12 - dodecabromo - 1,4,4a,4b,5,8,8a,9,10,10a - decahydro - 1,4,5,8 - dimethano - 9,10 - phenanthrene dicarboxylic anhydride is separated and recovered.

EXAMPLE IV

In this example 52 grams (1.0 mole) of vinylacetylene and 116 grams (1.0 mole) of maleic acid along with 1200 cc. of benzene are placed in a condensation apparatus which is thereafter heated to a temperature of about 80° C. Upon completion of the desired residence time, which is approximately 4 hours in duration, the apparatus and contents are allowed to cool to room temperature. The condensation product is recovered and 42 grams (0.25 mole) of this product along with 276 grams (0.51 mole) of hexabromocyclopentadiene and 200 cc. of benzene is treated in a manner similar to that set forth in the above examples. Upon completion of the desired residence time, the autoclave is opened and the desired product comprising 1,2,3,4,5,6,7,8,11,11,12,12 - dodecabromo-1,4,4a,-4b,5,8,8a,9,10,10a - decahydro - 1,4,5,8-dimethano-9,10-phenanthrene dicarboxylic acid is separated and recovered by conventional means.

EXAMPLE V

A mixture of 52 grams (1.0 mole) of vinylacetylene and 144 grams (1.0 mole) of the dimethyl ester of maleic acid along with 1200 cc. of benzene are placed in a condensation apparatus which is thereafter heated to a temperature of about 80° C. The mixture is maintained at this temperature for a period of about 4 hours after which the apparatus and contents thereof are allowed to cool to room toemperature. The condensation product is recovered and separated from the solvent and unreacted starting materials by conventional means. A mixture of 42 grams (0.25 mole) of the aforementioned condensation product and 186 grams (0.5 mole) of hexachlorocyclopentadiene along with 200 cc. of benzene is treated in a manner similar to that set forth in the above examples, that is, by placing the mixture in a rotating autoclave and heating to a temperature of about 150° C. for a period of about 4 hours. Upon completion of the desired residence time, the autoclave is opened and the desired product comprising the dimethyl ester of 1,2,3,4,5,6,7,8,-11,11,12,12 - dodecachloro - 1,4,4a,4b,5,8,8a,9,10,10a-decahydro - 1,4,5,8-dimethano - 9,10 - phenanthrene dicarboxylic anhydride is recovered.

I claim as my invention:

1. A process for the preparation of a compound selected from the group consisting of halo-substituted polyhydrodialkanophenanthrene dicarboxylic acids and carboxy derivatives thereof which comprises condensing a compound selected from the group consisting of maleic acid and carboxy derivatives thereof with vinylacetylene at condensation conditions, said carboxy derivatives of maleic acid being selected from the group consisting of:
   (a) corresponding anhydride;
   (b) mono- or di-hydrocarbyl esters in which the hydrocarbyl moiety(s) is selected from the group consisting of lower alkyl, cyclohexyl, phenyl, phenyl-substituted lower alkyl and lower alkyl-substituted phenyl;
   (c) alkali metal, alkaline earth metal or ammonium dicarboxylate; and
   (d) corresponding amide or nitrile thereafter further condensing the resultant product with a halo-substituted conjugated cycloalkadiene containing 5 or 6 carbon atoms and in which the halogen is selected from the group consisting of chlorine and bromine at condensation conditions, and recovering the resultant compound.

2. A process for the preparation of a compound selected from the group consisting of halo-substituted polyhydrodialkanophenanthrene dicarboxylic acids and carboxy derivatives thereof which comprises condensing a compound selected from the group consisting of maleic acid and carboxy derivatives thereof with vinylacetylene at a temperature in the range of from about 35° to about 125° C., said carboxy derivatives of maleic acid being selected from the group consisting of:
   (a) corresponding anhydride;
   (b) mono- or di-hydrocarbyl esters in which the hydrocarbyl moiety(s) is selected from the group consisting of lower alkyl, cyclohexyl, phenyl, phenyl-substituted lower alkyl and lower alkyl-substituted phenyl;
   (c) alkali metal, alkaline earth metal or ammonium dicarboxylate; and
   (d) corresponding amide or nitrile thereafter further condensing the resultant product with a halo-substituted conjugated cycloalkadiene containing 5 or 6 carbon atoms and in which the halogen is selected from the group consisting of chlorine and bromine at a temperature in the range of from about 50° to about 200° C., and recovering the resultant compound.

3. A process for the preparation of a compound selected from the group consisting of chloro-substituted polyhydrodialkanophenanthrene dicarboxylic acids and carboxy derivatives thereof which comprises condensing a compound selected from the group consisting of maleic acid and carboxy derivatives thereof with vinylacetylene at a temperature in the range of from about 35° to about 125° C., said carboxy derivatives of maleic acid being selected from the group consisting of:
   (a) corresponding anhydride;
   (b) mono- or di-hydrocarbyl esters in which the hydrocarbyl moiety(s) is selected from the group consisting of lower alkyl, cyclohexyl, phenyl, phenyl-substituted lower alkyl and lower alkyl-substituted phenyl;
   (c) alkali metal, alkaline earth metal or ammonium dicarboxylate; and
   (d) corresponding amide or nitrile thereafter further condensing the resultant product with a chloro-substituted conjugated cycloalkadiene containing 5 or 6 carbon atoms at a temperature in the range of from about 50° to about 200° C., and recovering the resultant compound.

ing materials prior to entry into said reactor. After a predetermined residence time has been completed, the condensation product is continuously withdrawn and separated from the reactor effluent, the starting materials which have been separated being recycled for further use as a portion of the feed stock.

Examples of halo-substituted polyhydrodialkanotricyclic dicarboxylic acids or carboxy derivatives thereof which are prepared according to the process herein described include 1,2,3,4,5,6,7,8,11,11,12,12-dodecachloro-1,4,4a,4b, 5,8,8a,9,10,10a-decahydro-1,4,5,8-dimethano-9,10-phenanthrene dicarboxylic anhydride, 1,2,3,4,5,6,7,8,11,11,12,12-dodecachloro-1,4,4a,4b, 5,8,8a,9,10,10a-decahydro-1,4,5,8-dimethano-9,10-phenanthrene dicarboxylic acid, 1,2,3,4,5,6,7,8,11,11,12,12-dodecabromo-1,4,4a,4b, 5,8,8a,9,10,10a-decahydro-1,4,5,8-dimethano-9, 10-phenanthrene dicarboxylic anhydride, 1,2,3,4,5,6,7,8,11,11,12,12-dodecabromo-1,4,4a,4b, 5,8,8a,9,10,10a-decahydro-1,4,5,8-dimethano-9, 10-phenanthrene dicarboxylic acid, 1,2,3,4,5,6,7,8-octachloro-1,4,4a,4b,5,8,8a,9,10,10a-decahydro-1,4,5,8-dimethano-9,10-phenanthrene dicarboxylic anhydride, 1,2,3,4,5,6,7,8,-octachloro-1,4,4a,4b,5,8,8a,9,10,10a-decahydro-1,4,5,8-dimethano-9,10-phenanthrene dicarboxylic acid, 1,2,3,4,5,6,7,8-octabromo-1,4,4a,4b,5,8,8a,9,10,10a-decahydro-1,4,5,8-dimethano-9,10-phenanthrene dicarboxylic anhydride, 1,2,3,4,5,6,7,8-octabromo-1,4,4a,4b,5,8,8a,9,10,10a-decahydro-1,4,5,8-dimethano-9,10-phenanthrene dicarboxylic acid, 1,2,3,4,5,6,7,8-octachloro-11,11,12,12-tetrabromo-1,4,4a,4b,5,8,8a,9,10,10a-decahydro-1,4,5,8-dimethano-9,10-phenanthrene dicarboxylic anhydride, 1,2,3,4,5,6,7,8-octachloro-11,11,12,12-tetrabromo-1,4,4a,4b,5,8,8a,9,10,10a-decahydro-1,4,5,8-dimethano-9,10-phenanthrene dicarboxylic acid, monomethyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, diethyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, monophenyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, dibenzyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, monotolyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, potassium 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, ammonium 1,2,3,4,5,6,7,8,11,11,12,12-dodecachloro-1,4,4a,4b,5,8,8a,9,10,10a-decahydro-1,4,5,8-dimethano-9-10-phenanthrene dicarboxylate, etc.

It is to be understood that the aforementioned compounds are merely representatives of the class of compounds which may be prepared according to the process herein described and that this invention is not necessarily limited thereto. Illustrative examples showing compounds containing only 2, 4, 6, etc. chloro- or bromo-substituents have been omitted for purposes of brevity.

As hereinbefore set forth, the aforementioned compounds which are prepared according to the process of the present invention find a wide variety of uses in the chemical field, especially as components of resins or plastics, the particular halo-substituted polyhydrodialkanotricyclic dicarboxylic acid or carboxy derivative thereof adding the desirable characteristic of making the resin or plastic fire retardant. For example, the halo-substituted polyhydrodialkanotricyclic dicarboxylic acid or carboxy derivative thereof may be one component of polymeric compositions of matter which contain, in addition to the halo-substituted polyhydrodialkanotricyclic dicarboxylic acid or carboxy derivative thereof, epoxy resins, urethanes, polyamides, polyamines, polyols, polyesters, etc. as components or reactants. In addition it is also contemplated that the halo-substituted polyhydrodialkanotricyclic dicarboxylic acids or anhydrides prepared according to the process of this invention, or their simple carboxy derivatives such as esters, amides, nitriles, salts and the like, may also be used as insecticides or insect repellents, the physical properties of these acids or anhydrides and the effects they have on entomological forms of life making them particularly desirable for this use. They are, for example, toxic to insects which are destructive of plant life and materials normally subject to insect infestation, the toxic effects being manifested by contact of the poison with the insect. The insecticides are thus effective against chewing as well as sucking types of insects. The halo-substituted polyhydrodialkanotricyclic dicarboxylic acids or anhydrides and certain simple derivatives are sufficiently volatile so that when applied to plant life intended for subsequent human consumption, the plants, when harvested and after a reasonable time for evaporation of the applied insecticide therefrom, retain none of the toxicant to prevent use of the plant for consumption as food. On the other hand, the compounds are of sufficiently limited volatility to be retained on the insect for the time required to accomplish the toxic effects of the compound. The active component of an insecticidal composition of matter which, in this instance, comprises the halo-substituted polyhydrodialkanotricyclic dicarboxylic acid compound will be present in the final composition in an amount ranging from about 0.1 to about 20%, the desired range being from about 0.1 to about 5% by weight of active component based on the total weight of the insecticidal composition.

The following examples are given to illustrate the process of the present invention which, however, are not intended to limit the generally broad scope of the present invention in strict accordance therewith.

EXAMPLE I

A glass liner containing 98 grams (1.0 mole) of maleic anhydride, 52 grams (1.0 mole) of vinylacetylene and 1200 cc. of toluene is sealed into an autoclave. The autoclave and contents thereof are then slowly heated to a temperature of about 90° C. and maintained thereat for a period of about 2 hours. At the end of this time the autoclave and contents thereof are cooled to room temperature and the reaction product resulting from the condensation of the maleic anhydride and vinylacetylene is recovered.

Following this a mixture of 75 grams (0.5 mole) of the condensation product prepared according to the above paragraph, 285 grams (1.05 mole) of the hexachlorocyclopentadiene and 200 cc. of toluene is placed in the glass liner of a rotating autoclave which is thereafter sealed into said autoclave. The mixture is heated to a temperature of about 150° C. and maintained thereat for a period of 4 hours. At the end of this time the autoclave and contents are allowed to cool to room temperature, any excess pressure which is present is vented and the reaction product comprising 1,2,3,4,5,6,7,8,11, 11, 12, 12 - dodecachloro - 1,4,4a,4b,5,8,8a,9,10,10a-decahydro-1,4,5,8 - dimethano-9,10 - phenanthrene dicarboxylic anhydride is separated from unreacted starting materials and recovered.

EXAMPLE II

In this example 52 grams (1.0 mole) of vinyacetylene and 116 grams (1.0 mole) of maleic acid are condensed 4. A process for the preparation of a compound selected from the group consisting of bromo-substituted polyhydrodialkanophenanthrene dicarboxylic acids and carboxy derivatives thereof which comprises condensing a compound selected from the group consisting of maleic acid and carboxy derivatives thereof with vinylacetylene at a temperature in the range of from about 35° to about 125° C., said carboxy derivatives of maleic acid being selected from the group consisting of:

(a) corresponding anhydride;
(b) mono- or di-hydrocarbyl esters in which the hydrocarbyl moiety(s) is selected from the group consisting of lower alkyl, cyclohexyl, phenyl, phenyl-substituted lower alkyl and lower alkyl-substituted phenyl;
(c) alkali metal, alkaline earth metal or ammonium dicarboxylate; and
(d) corresponding amide or nitrile thereafter further condensing the resultant product with a bromo-substituted conjugated cycloalkadiene containing 5 or 6 carbon atoms at a temperature in the range of from about 50° to about 200° C., and recovering the resultant compound.

5. A process for the preparation of a halo-substituted polyhydrodialkanophenanthrene dicarboxylic acid which comprises condensing maleic acid with vinylacetylene at a temperature in the range of from about 35° to about 125° C., thereafter further condensing the resultant product with a halo-substituted conjugated cycloalkadiene containing 5 or 6 carbon atoms and in which the halogen is selected from the group consisting of chlorine and bromine at a temperature in the range of from about 50° to about 200° C., and recovering the resultant halo-substituted polyhydrodialkanophenanthrene dicarboxylic acid.

6. A process for the preparation of a halo-substituted polyhydrodialkanophenanthrene dicarboxylic anhydride which comprises condensing maleic anhydride with vinylacetylene at a temperature in the range of from about 35° to about 125° C., thereafter further condensing the resultant product with a halo-substituted conjugated cycloalkadiene containing 5 or 6 carbon atoms and in which the halogen is selected from the group consisting of chlorine and bromine at a temperature in the range of from about 50° to about 200° C., and recovering the resultant halo-substituted polyhydrodialkanophenanthrene dicarboxylic anhydride.

7. A process for the preparation of a chloro-substituted polyhydrodialkanotricyclic dicarboxylic acid which comprises condensing maleic acid with vinylacetylene at a temperature in the range of from about 35° to about 125° C., thereafter further condensing the resultant product with hexachlorocyclopentadiene at a temperature in the range of from about 50° to about 200° C., and recovering the resultant 1,2,3,4,5,6,7,8,11,11,12,12-dodecachloro - 1,4,4a,4b,5,8,8a,9,10,10a-decahydro - 1,4,5,8-dimethano-9,10-phenanthrene dicarboxylic acid.

8. A process for the preparation of a chloro-substituted polyhydrodialkanotricyclic dicarboxylic anhydride which comprises condensing maleic anhydride with vinylacetylene at a temperature in the range of from about 35° to about 125° C., thereafter further condensing the resultant product with hexachlorocyclopentadiene at a temperature in the range of from about 50° to about 200° C., and recovering the resultant 1,2,3,4,5,6,7,8,11,11,12,12-dodecachloro-1,4,4a,4b,5,8,8a,9,10,10a - decahydro - 1,4,5,8 - dimethano-9,10-phenanthrene dicarboxylic anhydride.

9. A process for the preparation of a bromo-substituted polyhydrodialkanotricyclic dicarboxylic acid which comprises condensing maleic acid with vinylacetylene at a temperature in the range of from about 35° to about 125° C., thereafter further condensing the resultant product with hexabromocyclopentadiene at a temperature in the range of from about 50° to about 200° C., and recovering the resultant 1,2,3,4,5,6,7,8,11,11,12,12 - dodecabromo - 1,4,4a,4b,5,8,8a,9,10,10a - decahydro - 1,4,5,8-dimethano-9,10-phenanthrene dicarboxylic acid.

10. A process for the preparation of a bromo-substituted polyhydrodialkanotricyclic dicarboxylic anhydride which comprises condensing maleic anhydride with vinylacetylene at a temperature in the range of from about 35° to about 125° C., thereafter further condensing the resultant product with hexabromocyclopentadiene at a temperature in the range of from about 50° to about 200° C., and recovering the resultant 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylic anhydride.

References Cited
UNITED STATES PATENTS 3,121,738   2/1964   Fields _____ 260—514

OTHER REFERENCES

Dane et al., Liebig's Ann. Der. Chem., vol. 532, p. 43–46 (1937).

ALTON D. ROLLINS, *Primary Examiner.*

B. DENTZ, *Assistant Examiner.*